C. L. MICHOD.
ELECTRIC TRANSMISSION LINE.
APPLICATION FILED AUG. 15, 1912.
1,106,468.  Patented Aug. 11, 1914.
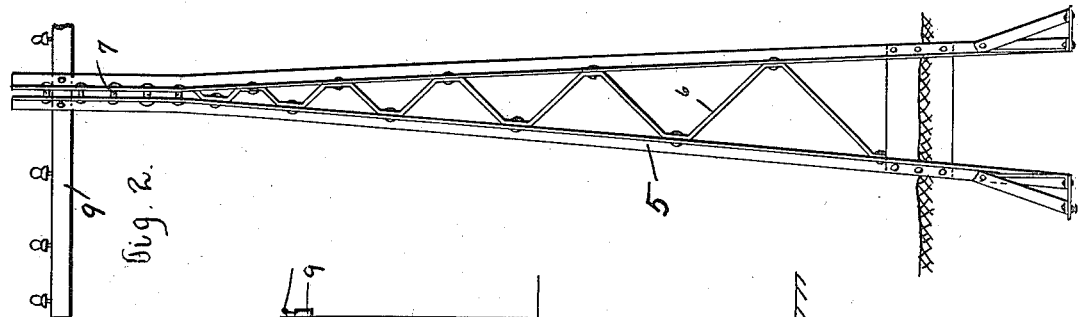
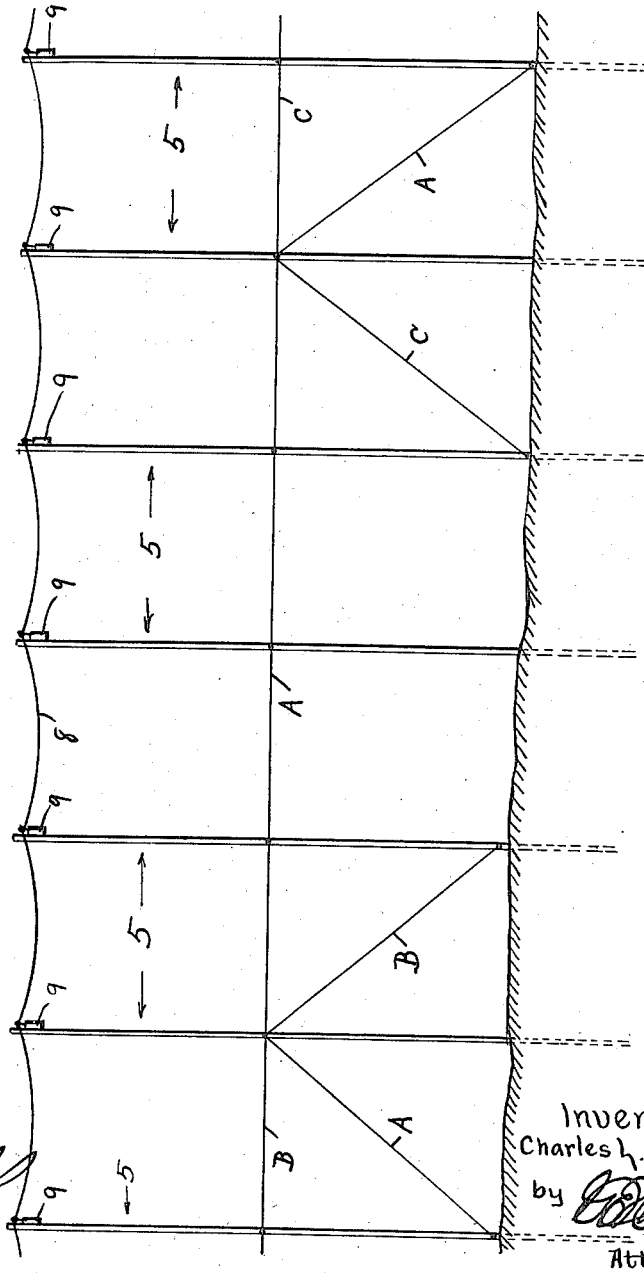
Witnesses.
Inventor.
Charles L. Michod.
by
Attorney.

UNITED STATES PATENT OFFICE.

CHARLES L. MICHOD, OF CHICAGO HEIGHTS, ILLINOIS.

ELECTRIC TRANSMISSION-LINE.

1,106,468.  Specification of Letters Patent.  Patented Aug. 11, 1914.

Application filed August 15, 1912. Serial No. 715,215.

*To all whom it may concern:*

Be it known that I, CHARLES L. MICHOD, a citizen of the United States, residing at Chicago Heights, in the county of Cook and State of Illinois, have invented new and useful Improvements in Electric Transmission-Lines, of which the following is a specification.

In designing steel towers, poles, etc., for electric transmission lines, the tendency has been in the past that each pole be considered so that it should have sufficient strength to take care of any breakage of wires through its own strength and thus a large amount or bulk of material was required.

The idea of using flexible steel poles has been, to a certain extent exploited as far as the poles are concerned, but these poles have been set in concrete, as a rule, or fixed so that they could not utilize their elasticity or flexibility to the extent that they could be used, in connection with an anchored base. There is now no means of directly taking care of the benefits to be derived from using the elasticity of the metal. This is what my system covers.

It is the object of this invention to produce a means to carry the wires, and instead of relying on the strength all being in the pole itself, or of utilizing the wires which are used to carry the electricity to supply a certain part of the mechanical strength, it is my intention to have separate mechanical means for holding these poles in alinement. By this method of construction I reduce the cost of transmission systems as now used as I reduce the tonnage of steel required and require of the transmission wires less mechanical strength. I accomplish this object by the means described in and illustrated in the following specification, the accompanying drawings forming a part thereof in which:

Figure 1 is a side elevation of the preferable construction of a metal pole used in a transmission line. Fig. 2 is a diagrammatic view of a portion of a transmission line embodying my invention.

In the drawings, 5 is a metal pole or tower which is preferably constructed of two members composed of angle iron or T-iron which are separated a distance at their base and gradually approach each other to near their top and are tied together by brace bars 6 and at their top by rivets 7. These towers are not specifically claimed herein as they are claimed in my application No. 682,871, filed March 11, 1912. These towers are set in the ground with their greatest width at right angles to the transmission wire 8 which is carried by the cross arm 9 at the top of the tower. The members of these towers brace each other and are strengthened and braced by bars 6 and are thereby adapted to carry the side strain on the line. In the other direction the towers are not strong enough, unsupported, to carry the strains and I provide strain wires which I connect at the ends, to towers at the ground line or to anchors in the ground and then run up to about the center of the adjacent towers to which the wire is secured. The wire then runs from pole to pole to each of which it is secured. I prefer to have a single strain wire connect five poles. In the drawings I have shown a full length strain wire A, and portions of two other strain wires B and C. It will be observed that each strain wire at the beginning and end of the pole connections is connected to a pole to which the adjacent strain wire is connected, thereby guying the common pole against longitudinal stress in either direction. A greater or less number of poles than five can be connected by a single strain wire. Any other form of pole may be used. All connections of the strain wires to the poles are rigid connections.

By the use of strain wires along the line to guy the longitudinal stress and by the use of poles composed of members braced transversely I am able to construct an electric transmission line with much less material than is possible where the poles must bear the whole longitudinal and transverse stresses.

Having described my invention what I claim is:

1. In a transmission line the combination of line poles; and a plurality of longitudinally extending independent strain wires rigidly connected to a plurality of poles near the centers thereof and having their ends secured at the ground line to anchoring means, each longitudinal strain wire being rigidly connected at each end of the pole connection to a pole to which an adjacent strain wire is connected.

2. In a transmission line the combination of flexible line poles having a base anchored beneath the ground line; strain wires rigidly connected to a plurality of poles between the top and the ground line; and anchoring means at the ground line connected to said strain wires, each longitudinal strain wire being rigidly connected at each end of the pole connection to a pole to which an adjacent strain wire is connected.

3. In a transmission line the combination of line poles composed of braced members set transversely to the transmission line; a plurality of longitudinally extending independent strain wires each rigidly connected to a plurality of poles near the centers of the poles; and anchoring means at the ends of the strain wires.

In witness that I claim the foregoing I have hereunto subscribed by name this 27th day of July, 1912.

CHARLES L. MICHOD.

Witnesses:
 MABEL F. LAKE,
 E. L. HAMMOND.